(12) United States Patent
Bruno et al.

(10) Patent No.: US 10,160,547 B2
(45) Date of Patent: Dec. 25, 2018

(54) AIRCRAFT ENVIRONMENTAL CONTROL SYSTEM

(71) Applicant: Hamilton Sundstrand Corporation, Windsor Locks, CT (US)

(72) Inventors: Louis J. Bruno, Ellington, CT (US); Harold W. Hipsky, Willington, CT (US); Donald E. Army, Jr., Enfield, CT (US); Erin G. Kline, Vernon, CT (US); Christina W. Millot, Wilbraham, MA (US); Paul M. D'Orlando, Simsbury, CT (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 246 days.

(21) Appl. No.: 14/721,603

(22) Filed: May 26, 2015

(65) Prior Publication Data
US 2016/0347456 A1    Dec. 1, 2016

(51) Int. Cl.
*F25D 9/00* (2006.01)
*B64D 13/06* (2006.01)
*F02C 6/08* (2006.01)

(52) U.S. Cl.
CPC ............ *B64D 13/06* (2013.01); *F02C 6/08* (2013.01); *B64D 2013/0648* (2013.01)

(58) Field of Classification Search
CPC ............ B64D 13/06; B64D 2013/0648; B64D 2013/0611; B64D 2013/0618; B64D 2013/0688; F02C 6/08; F25B 11/00; F24F 2203/023

USPC .......................................................... 62/401
See application file for complete search history.

(56) References Cited

U.S. PATENT DOCUMENTS

| | | | | |
|---|---|---|---|---|
| 4,261,416 A | * | 4/1981 | Hamamoto | B64D 13/06 165/271 |
| 5,461,882 A | * | 10/1995 | Zywiak | B60H 1/00007 62/401 |
| 5,967,461 A | * | 10/1999 | Farrington | B64D 13/06 244/118.5 |
| 6,199,387 B1 | * | 3/2001 | Sauterleute | B64D 13/06 62/87 |
| 6,257,003 B1 | * | 7/2001 | Hipsky | B64D 13/06 62/402 |
| 6,845,630 B2 | | 1/2005 | Bruno et al. | |
| 6,883,335 B2 | | 4/2005 | Axe et al. | |

(Continued)

FOREIGN PATENT DOCUMENTS

EP    2845803 A1    3/2015

OTHER PUBLICATIONS

European Search Report and Written Opinion; European Application No. 16171414.2; International Filing Date: May 25, 2016; dated Jan. 31, 2017; 7 pages.

*Primary Examiner* — Joseph Trpisovsky
(74) *Attorney, Agent, or Firm* — Cantor Colburn LLP (57) ABSTRACT

An environmental control system (ECS) pack is provided including a primary heat exchanger and a secondary heat exchanger. An air cycle machine is arranged in fluid communication with at least one of the primary and second heat exchanger. The air cycle machine includes a compressor and a plurality of turbines. Discharged cabin air is supplied to at least one of the plurality of turbines to operate the compressor.

14 Claims, 8 Drawing Sheets

(56) References Cited

U.S. PATENT DOCUMENTS

| | | | |
|---|---|---|---|
| 2007/0113579 A1* | 5/2007 | Claeys | B64D 13/02 |
| | | | 62/401 |
| 2012/0285184 A1 | 11/2012 | Voinov | |
| 2013/0277009 A1 | 10/2013 | Army | |
| 2014/0161698 A1* | 6/2014 | Klimpel | B01D 53/1425 |
| | | | 423/228 |
| 2015/0065025 A1 | 3/2015 | Bruno et al. | |

* cited by examiner

AIRCRAFT ENVIRONMENTAL CONTROL SYSTEM

BACKGROUND OF THE INVENTION

Embodiments of the invention relate to aircraft environmental control systems, and more particularly, to a gas turbine engine compressor air supply of an aircraft environmental control system.

In a typical gas turbine engine, a compressor compresses air and passes that air along a primary flow path to a combustor where it is mixed with fuel and combusted. The combusted mixture expands and is passed to a turbine, which is forced to rotate due to the passing combusted mixture. When used on an aircraft, the primary purpose of this system is to provide propulsive force for the aircraft.

In some gas turbine engines, a portion of the air compressed by the compressor is diverted from the primary flow path to a bleed inlet of a bleed air system. This compressed bleed air can be used for a variety of purposes, such as to de-ice a wing or to provide pressurized air to a cabin of the aircraft. Because the bleed air is often at an undesirably high temperature, a heat exchanger is used to cool the bleed air. Bleeding off and cooling compressed air typically does not generate thrust, thus reducing the efficiency of the compressor and the entire gas turbine engine. Moreover, the heat exchanger takes up a relatively large amount of space and can increase the overall weight of the bleed air system. The higher the pressure of the compressed bleed air the greater the efficiency debit to the gas turbine engine.

BRIEF DESCRIPTION OF THE INVENTION

According to another embodiment of the invention, an environmental control system (ECS) pack is provided including a primary heat exchanger and a secondary heat exchanger. An air cycle machine is arranged in fluid communication with at least one of the primary and second heat exchanger. The air cycle machine includes a compressor and a plurality of turbines. Discharged cabin air is supplied to at least one of the plurality of turbines to operate the compressor.

According to another embodiment of the invention, an environmental control system (ECS) system is provided including at least one ECS pack to condition bleed air prior to providing the bleed air to a cabin of the aircraft. The at least one ECS pack includes a primary heat exchanger and a secondary heat exchanger. An air cycle machine has a compressor and a plurality of turbines arranged in fluid communication with at least one of the primary and secondary heat exchanger. The ECS pack is configured to operate in a plurality of operational modes. An operational mode of the at least one ECS pack is selected based on a flight condition of the aircraft and a pressure of the bleed air supplied thereto.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
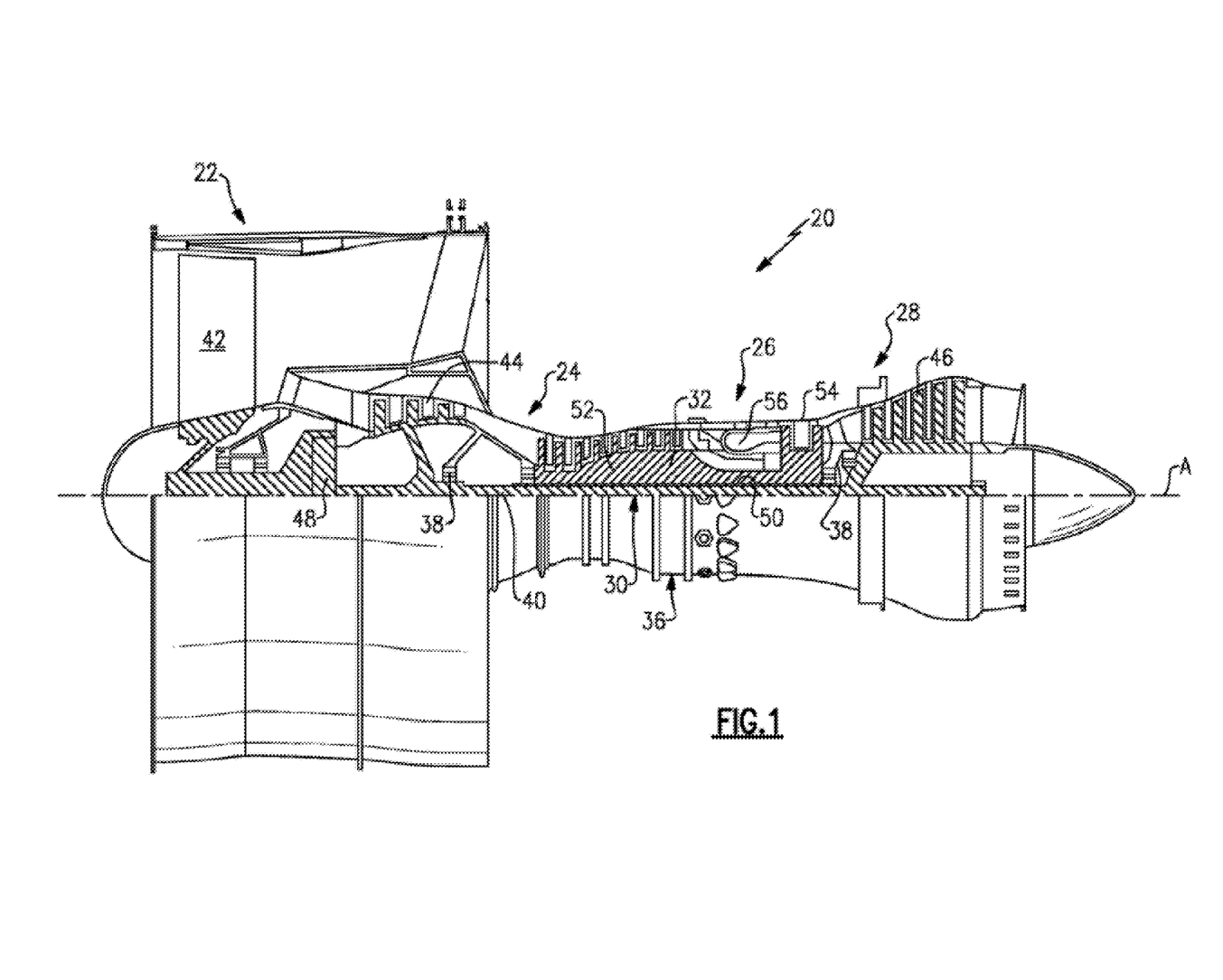
FIG. 1 is a cross-sectional view of a gas turbine engine of an aircraft.
Figure 2:
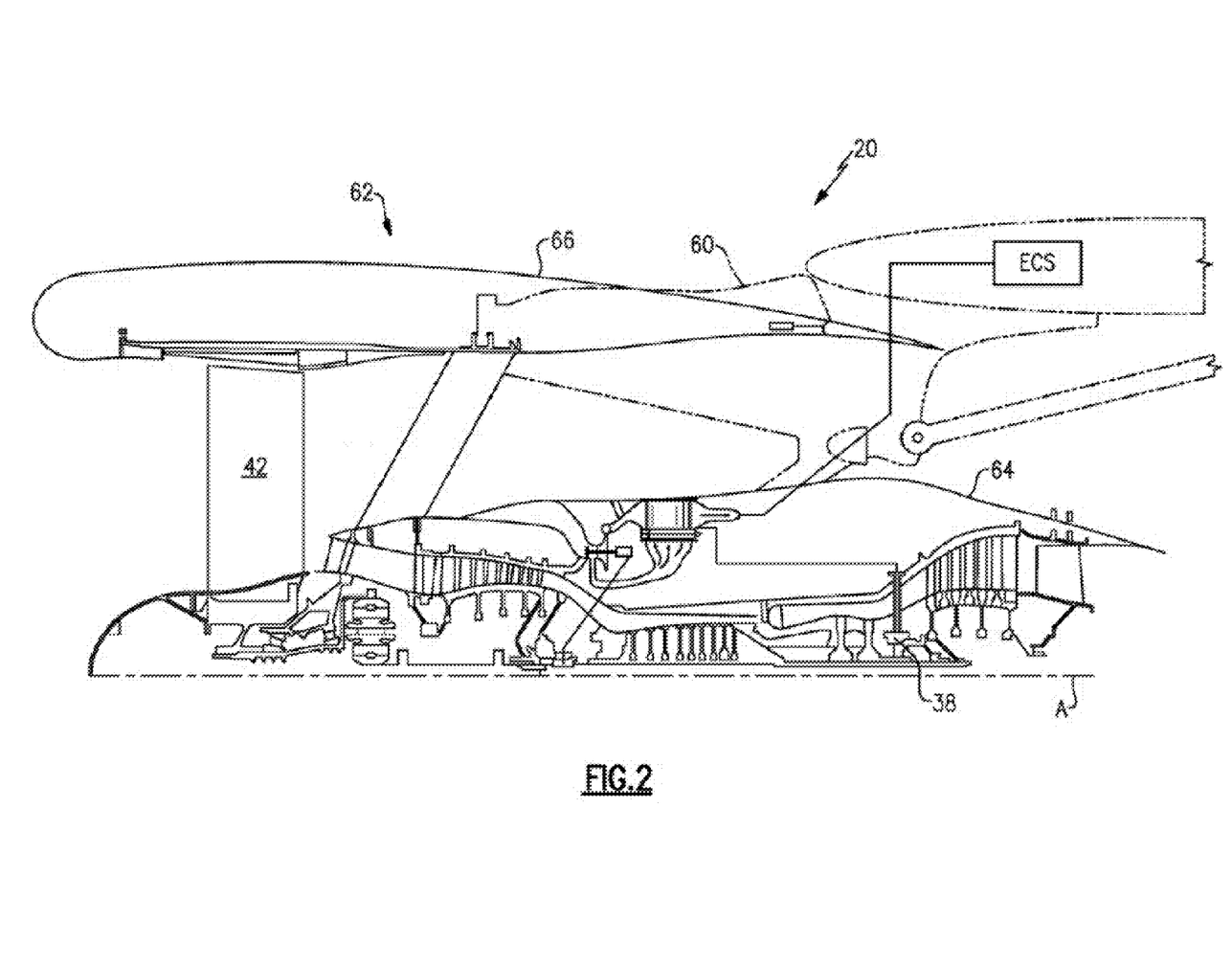
FIG. 2 is another cross-sectional view of a gas turbine engine within the nacelle assembly.

Referring now to FIGS. 1 and 2, an example of a gas turbine engine 20 configured for use in an aircraft is illustrated schematically. The gas turbine engine 20 disclosed herein is a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path while the compressor section 24 drives air along a core flow path for compression and communication into the combustor section 26 and then expansion through the turbine section 28. Although depicted as a turbofan gas turbine engine 20 in the disclosed non-limiting embodiment, it should be understood that the concepts described herein are not limited to use with turbofans as the teachings may be applied to other types of turbine engines, such as three-spool architectures for example.

The engine 20 generally includes a low spool 30 and a high spool 32 mounted for rotation about an engine central longitudinal axis A relative to an engine static structure 36 via several bearing systems 38. It should be understood that various bearing systems 38 at various locations may alternatively or additionally be provided.

The low spool 30 generally includes an inner shaft 40 that interconnects a fan 42, a low pressure compressor 44, and a low pressure turbine 46. The inner shaft 40 may be connected to the fan 42 directly or through a geared architecture 48 to drive the fan 42 at a different, typically lower speed than the low spool 30. The high spool 32 includes an outer shaft 50 that interconnects a high pressure compressor 52 and a high pressure turbine 54. A combustor 56 is arranged between the high pressure compressor 52 and the high pressure turbine 54. The inner shaft 40 and the outer shaft 50 are concentric and rotate about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 56 and low pressure turbine 46. The turbines 54, 46 rotationally drive the respective low spool 30 and high spool 32 in response to the expansion.

With reference to FIG. 2, the gas turbine engine 20 is mounted to an engine pylon structure 60 within an engine nacelle assembly 62 as is typical of an aircraft designed for subsonic operation. The nacelle assembly 62 generally includes a core nacelle 64 and a fan nacelle 66. It should be appreciated that the core nacelle 64 and the fan nacelle 66 may be of various configurations.

Figure 3:
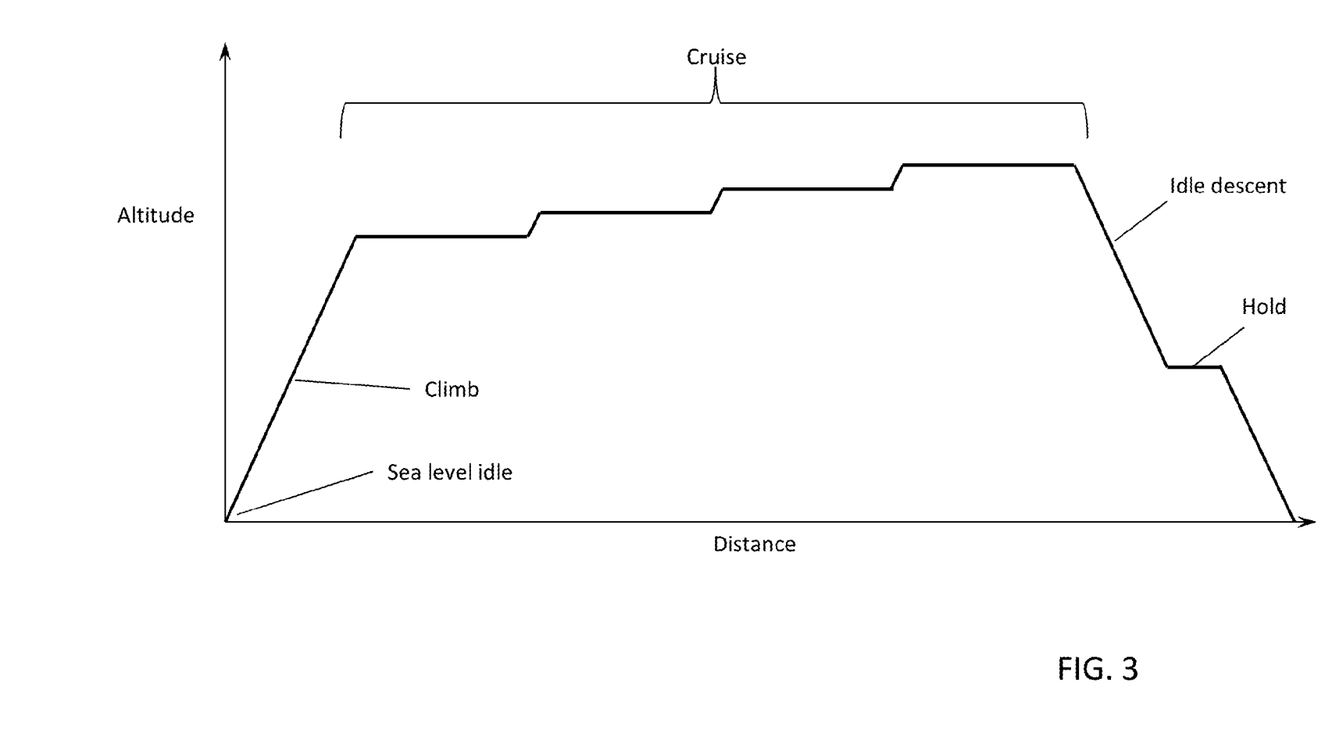
FIG. 3 is a schematic diagram of an example of a flight profile of an aircraft.
Figure 4:
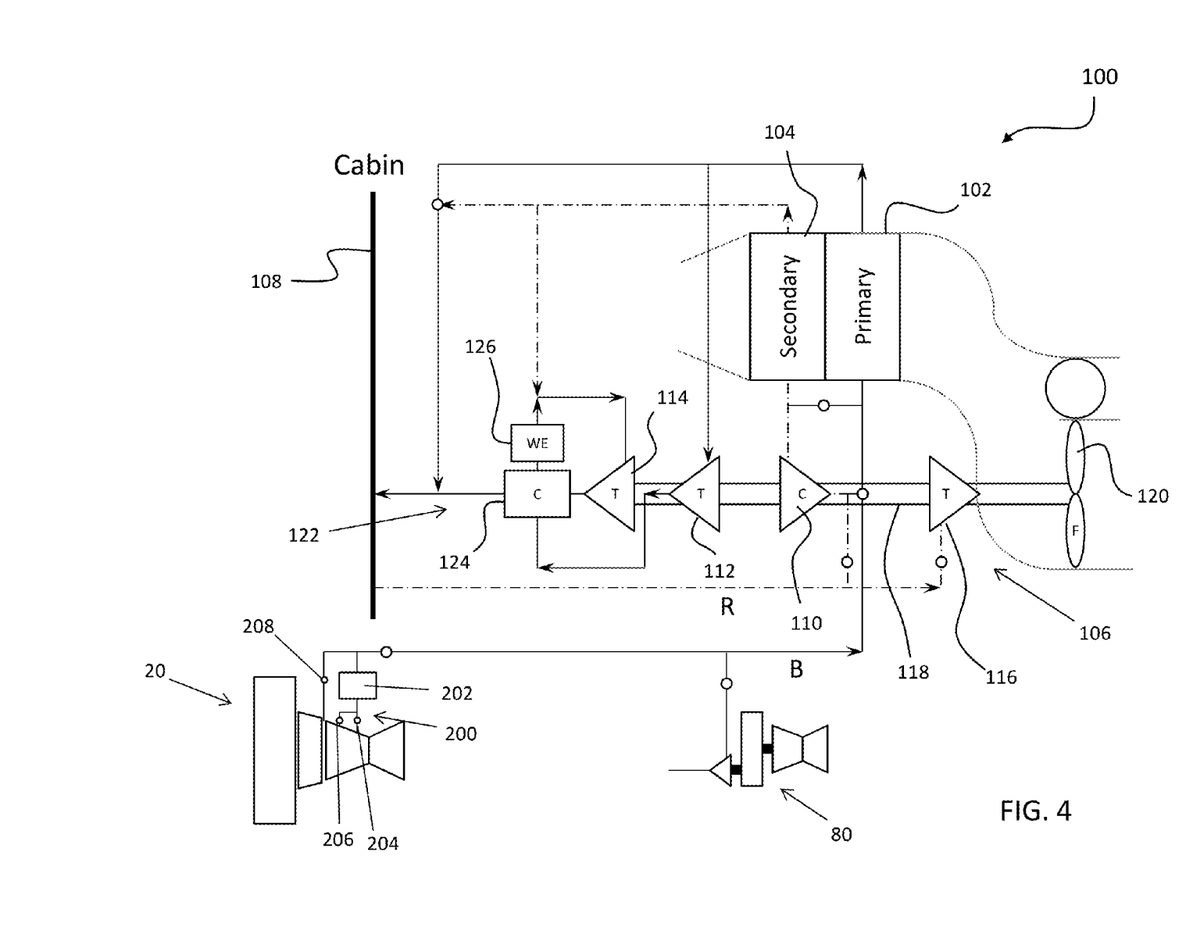
FIG. 4 is a schematic diagram of an ECS pack of an environmental control system (ECS) of an aircraft.

Referring now to FIG. 3, an example of the various flight conditions that occur during a typical flight of an aircraft are illustrated. Upon takeoff, the aircraft begins to climb until reaching a desired cruising altitude, typically between 35000 and 43000 feet for a large commercial aircraft. When preparing to land, after flying a desired distance, the aircraft enters into a descent where one of more of the engines 20 are idle. In some instances, such as in the event of excessive incoming and outgoing traffic at an airport, the aircraft may enter into a hold condition at some altitude below the cruising altitude.

Referring now to FIGS. 4-8, a portion 100 of an environmental control system (ECS) of an aircraft is illustrated in more detail. The ECS may include any number of ECS packs 100 configured to supply conditioned air to various heat loads of the aircraft. The ECS pack 100 includes a primary heat exchanger 102 and a secondary heat exchanger 104 configured to receive a flow of cool ram air. An air cycle machine (ACM) 106 is arranged in fluid communication with not only the primary and secondary heat exchanger 102, 104, but also with the cabin 108 to receive a flow of recirculation air (R) therefrom. In one embodiment, the ACM 106 has a compressor 110 and three distinct turbines 112, 114, 116 located on a common shaft 118 with a fan 120. A water separator 122 consisting of a condensing heat exchanger 124 and a water extractor 126 is fluidly coupled to at least one of the turbines 112, 114, 116 of the air cycle machine 106.

Figure 5:
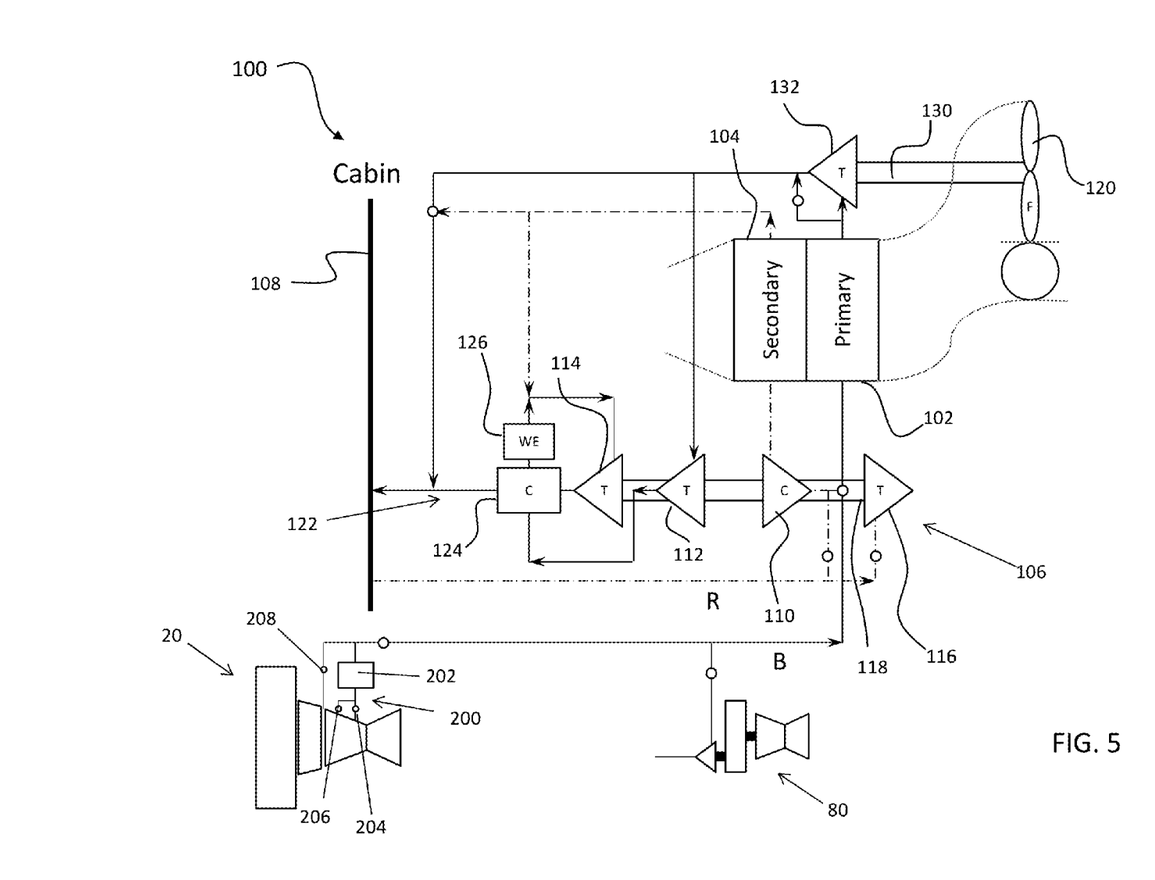
FIG. 5 is a schematic diagram of another ECS pack of an environmental control system (ECS) of an aircraft.

In the non-limiting embodiment illustrated in FIG. 5, the ECS pack 100 includes a second shaft 130 including a turbine 132 arranged in fluid communication with at least one of the primary and secondary heat exchanger 102, 104. In such embodiments, the fan 120 is mounted to the second shaft 130. As a result, air from the engine or APU may be expanded twice. By including a second shaft 130 in an ECS pack 100, greater optimization of the ACMs, turbines, compressors, and fans may be achieved.

As shown in each of the FIGS., the air provided to the ECS pack 100 is either bled from a gas turbine engine 20 or an auxiliary power unit 80. A compressor bleed air supply system 200 configured to supply air from the gas turbine engine 20 to an ECS pack 100 includes a precooler 202, such as an air to air heat exchanger in fluid communication with a source of cooling air for example, which may be used to cool the compressor bleed air before it is provided to the ECS pack 100. In addition, the compressor bleed air supply system 200 includes a high pressure port 204, and intermediate pressure port 206, and a low pressure port 208, configured to bleed air from various portions of an engine 20. The intermediate pressure port 206 is configured to bleed air from a portion of the engine 20 having a pressure generally greater than the air at the low pressure port 208 and lower than the air at the high pressure port 204. As a result, the temperature of the bleed air at the high pressure port 204 is warmest, the temperature of the bleed air at the low pressure port 208 is coolest, and the temperature of the bleed air at the intermediate port 206 is generally there between.

The ECS also includes a controller (not shown) operably coupled to both the compressor bleed system 200 and the APU 80 to control a source of the air B provided to the ECS pack 100. In one embodiment, the controller is additionally configured to operate the ECS pack 100 in one of a plurality of operational modes based on a flight condition of the aircraft (FIG. 3) and the pressure of the air (B) provided to the ECS pack 100. Examples of operational modes of an ECS pack 100 include a high pressure mode, a recirculation chill mode, and a pressure boost mode. The ECS pack 100 may be configured to operate in the high pressure mode when the pressure of the air B provided to the ECS pack 100 is adequate to drive the ACM 106 or when the temperature demand of the cabin 108 requires it. For example, the ECS pack 100 may be configured to operate in a high pressure mode when the aircraft flight condition is ground idle, taxi, take-off, climb, descent, or hold. Alternatively, or in addition, when the aircraft is in an extreme temperature, high altitude cruise condition, one or more of the ECS packs 100 may be configured to operate in the high pressure mode.

The ECS pack 100 may be configured to operate in the recirculation chill mode when the aircraft is in a flight condition, such as a cruise condition above 30,000 feet for example, where the pressure of the air B provided from the engine 20 or APU 80 to the ECS pack 100 is approximately 1-3 psi above the cabin pressure. Similarly, the ECS pack 100 may be configured to operate in the pressure boost mode when the aircraft is in a flight condition, such as a cruise condition above 30,000 feet for example, where the pressure of the air B provided from the engine 20 or APU 80 to the ECS pack 100 is up to about 2.5 psi below the pressure of the cabin 108.

Figure 6:
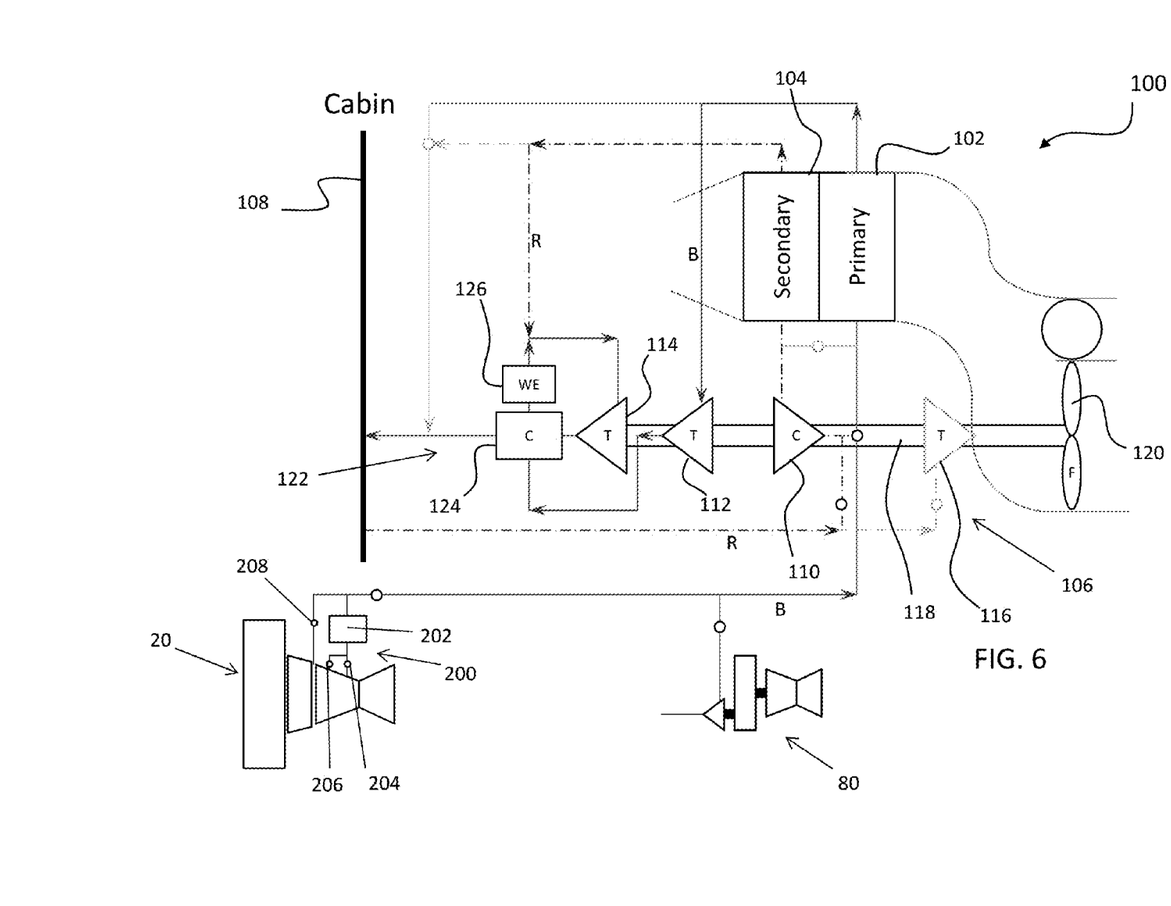
FIG. 6 is a schematic diagram of the ECS pack of FIG. 6 operating in a high pressure mode according to an embodiment of the present disclosure.

In the high pressure mode, as shown in FIG. 6, hot high-pressure bleed air B drawn from the engine 20 or the APU 80 is supplied to the primary heat exchanger 102 where it is cooled by ram air. The warm air then enters a first turbine 112 of the ACM 106, where it is cooled by the process of extracting work. From the first turbine 112, the air is provided to the water separator 122 where at least a portion of the moisture is removed from the air. At the outlet of the water separator 122, the bleed air B is mixed with some recirculation air R discharged from the cabin 108. The recirculation air R is pressurized by the compressor 110 of the air cycle machine 106 and cooled by the secondary heat exchanger 104 prior to being mixed with the bleed air B, thereby reducing the moisture within the air mixture. The mixed air then enters the second turbine 114 of the ACM 106 where it is again cooled by the process of extracting work. The cold air discharged from the second turbine 114 is then heated in a portion of the water extractor 122 before being supplied to the cabin 108 and flight deck (not shown) as conditioned air.

Figure 7:
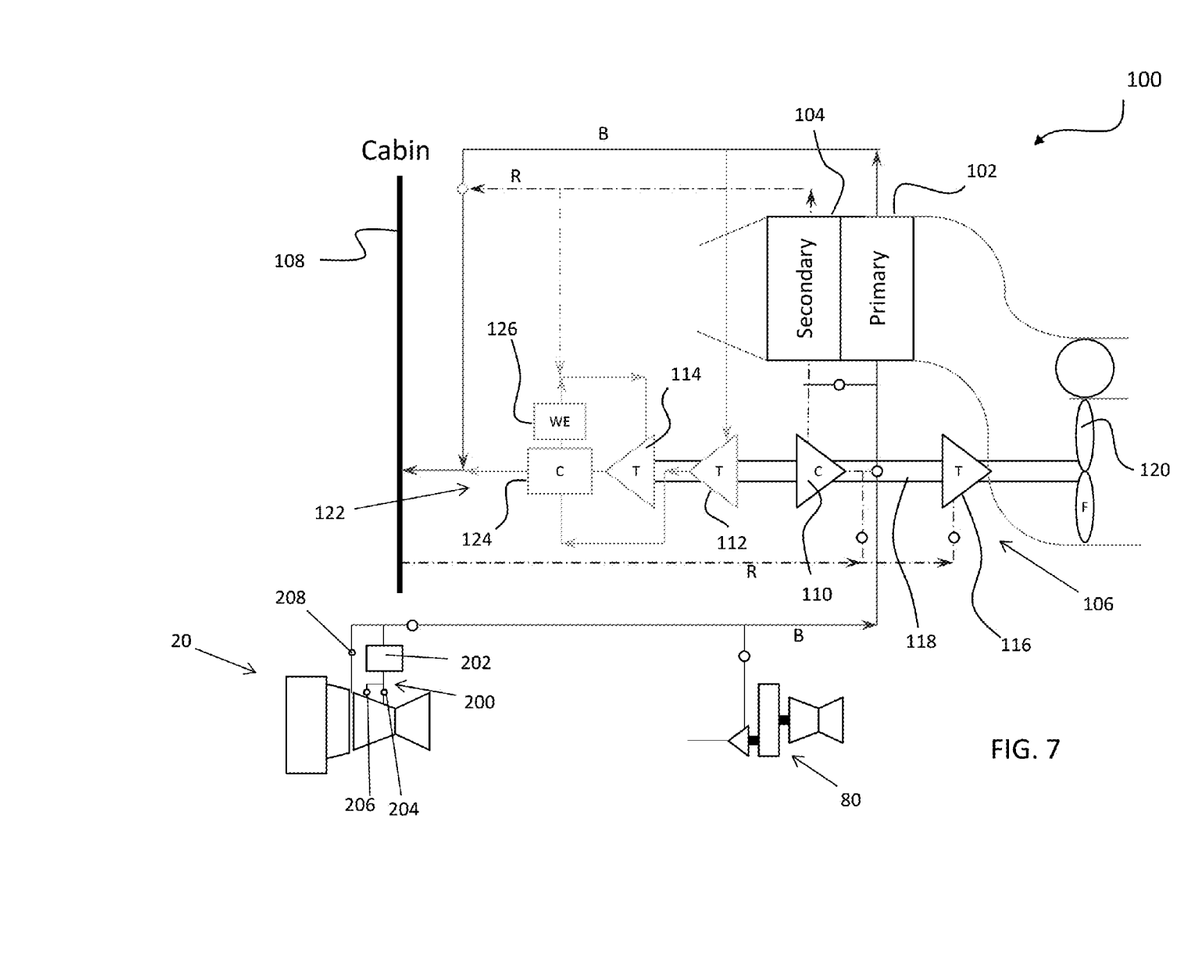
FIG. 7 is a schematic diagram of the ECS pack of FIG. 6 operating in a recirculation chill mode according to an embodiment of the present disclosure.

Referring now to FIG. 7, operation of the ECS pack 100 in a recirculation chill mode is illustrated in more detail. Recirculation air R discharged from the cabin 108 is supplied to the compressor 110 of the ACM 106 where it is pressurized and heated. The hot cabin air is then provided to the secondary heat exchanger 104 where it is cooled via a heat transfer relationship with cool ram air. Downstream from the secondary heat exchanger 104, the cooled cabin air R is mixed with air B supplied from either the engine 20 or the APU 80 and cooled by the primary heat exchanger 102. The air mixture is then configured to bypass the turbines of the ACM 106 and the water separator 122 and is supplied directly back to the cabin 108 and flight deck as conditioned air. When the ECS pack 100 is operated in this recirculation chill mode, a portion of the cabin discharge air R is additionally provided to turbine 116 of the ACM 106. The cabin air provided to turbine 116 is used pressurize the recirculation air. The work extracted from the cabin discharge air in the turbine 116 operates the ACM 106 at the speed required by the compressor 110 to sufficiently increase the pressure of the cabin recirculation air R therein such that it may flow through the secondary heat exchanger 104 and into the cabin 108.

Figure 8:
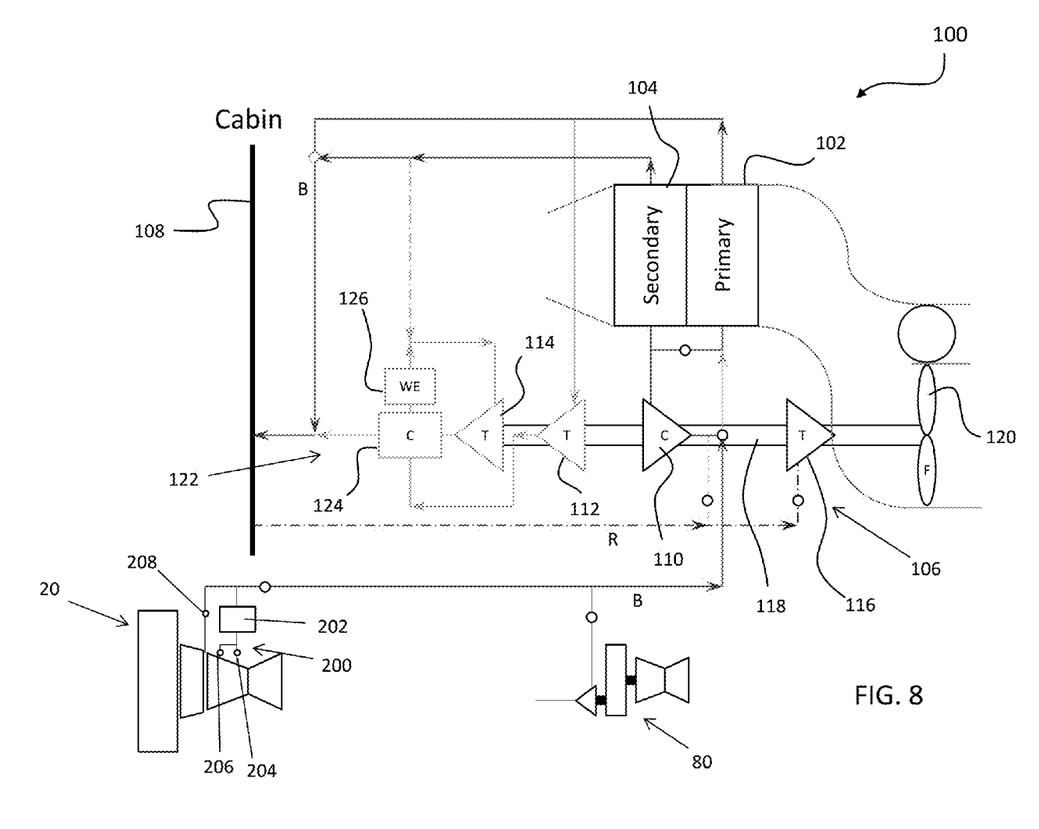
FIG. 8 is a schematic diagram of the ECS pack of FIG. 6 operating in a pressure boost mode according to an embodiment of the present disclosure.

When the ECS pack 100 is operated in a pressure boost mode, as shown in FIG. 8, air B from either the engine 20 or the APU 80 enters the compressor 110 of the ACM 106 where it is pressurized and heated. The pressurized air then passes through one or both of the primary heat exchanger 102 and the secondary heat exchanger 104 where it is cooled by ram air to a desired temperature of the cabin 108. From the heat exchangers 102, 104, the air B is provided directly to the cabin 108. Cabin discharge air R is provided to a turbine 116 of the ACM 106 to pressurize the bleed air. The work extracted from the cabin discharge air R in turbine 116 operates the ACM 106 at the speed required by the compressor 110 to sufficiently increase the pressure of the bleed air B such that it may flow through at least one of the primary and secondary heat exchanger 102, 104 to the cabin 108. The cabin discharge air R may then be expelled from the turbine 116 to the ambient air outside the aircraft.

By selecting a mode of operating an ECS pack 100 based on the flight condition of an aircraft and the pressure of the bleed air B provided thereto, operation of the ECS pack 100 may be optimized to minimize a pressure difference between the bleed air and the air being supplied to the cabin 108. As a result, the ECS of an aircraft can be operated in the most efficient mode, thereby reducing the overall bleed related penalties and improving the fuel burn of the aircraft over the duration of a flight profile.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An environmental control system (ECS) pack, comprising:
 a primary heat exchanger configured for thermal energy exchange between a flow of bleed air and a flow of ram air;
 a secondary heat exchanger configured for thermal energy exchange between a flow of discharge cabin air and the flow of ram air;
 an air cycle machine arranged in fluid communication with at least one of the primary heat exchanger and secondary heat exchanger, the air cycle machine includes a compressor and a plurality of turbines disposed at a first shaft, wherein the discharged cabin air is supplied to at least one of the plurality of turbines to operate the compressor of the air cycle machine; and
 a fan and a fan turbine disposed at a second shaft, non coaxial with the first shaft, to urge the flow of ram air across the primary heat exchanger and the secondary heat exchanger, the fan turbine driven by the flow of bleed air routed through the primary heat exchanger upstream of the fan turbine, prior to the flow of bleed air being routed through a condensing heat exchanger, wherein the discharged cabin air is pressurized in the compressor of the air cycle machine, cooled in the secondary heat exchanger, and mixed with the flow of bleed air being routed though the condensing heat exchanger.

2. The ECS pack according to claim 1, wherein the ECS pack is configured to condition air from at least one of an engine and an auxiliary power unit and provide the conditioned air to a cabin.

3. The ECS pack according to claim 2, wherein the discharged cabin air is expelled to ambient from the at least one turbine.

4. The ECS pack according to claim 3, wherein a pressure of the air provided to the ECS pack from the at least one of an engine and an auxiliary power unit is between a cabin pressure and up to 2.5 psi below the cabin pressure.

5. The ECS pack according to claim 2, wherein a pressure of the air provided to the ECS pack from the at least one of an engine and an auxiliary power unit is between 1 psi above a cabin pressure and 3 psi above the cabin pressure.

6. The ECS pack according to claim 2, wherein the air from the at least one of an engine and an auxiliary power unit is configured to flow through at least the primary heat exchanger and at least one of the plurality of turbines of the air cycle machine.

7. The ECS pack of claim 1, wherein the flow of bleed air is supplied to at least two turbines of the plurality of turbines disposed at the first shaft after the flow of bleed air flows through the primary heat exchanger.

8. An environmental control system (ECS) of an aircraft, comprising:
 at least one ECS pack configured to condition bleed air prior to providing the bleed air to a cabin of the aircraft, the at least one ECS pack includes a primary heat exchanger, a secondary heat exchanger, and an air cycle machine having a compressor and a plurality of turbines arranged on a first shaft in fluid communication with at least one of the primary heat exchanger and secondary heat exchanger, wherein the ECS pack is configured to operate in a plurality of operational modes, an operational mode of the at least one ECS pack being selected based on a flight condition of the aircraft and a pressure of the bleed air supplied thereto; and
 a fan and a fan turbine disposed at a second shaft, non coaxial with the first shaft, to urge a flow of ram air across the primary heat exchanger and the secondary heat exchanger, the fan turbine driven by a flow of bleed air routed through the primary heat exchanger upstream of the fan turbine, prior to the flow of bleed air being routed through a condensing heat exchanger;
 wherein the primary heat exchanger is configured for thermal energy exchange between the flow of bleed air and the flow of ram air; and
 wherein the secondary heat exchanger is configured for thermal energy exchange between a flow of discharge cabin air and the flow of ram air;
 wherein the flow of bleed air is selectably urged from a gas turbine engine or an auxiliary power unit, depending on a selected operational mode of the plurality of operational modes, wherein the discharged cabin air is pressurized in the compressor of the air cycle machine, cooled in the secondary heat exchanger, and mixed with the flow of bleed air being routed though the condensing heat exchanger.

9. The ECS according to claim 8, wherein the plurality of operational modes includes at least one of a high pressure mode, a recirculation chill mode, and a pressure boost mode.

10. The ECS according to claim 9, wherein the ECS pack is configured to operate in a high pressure mode when a flight condition of the aircraft is one of ground idle, taxi, take-off, climb, descent, and hold.

11. The ECS according to claim 9, wherein the ECS pack is configured to operate in a high pressure mode when the aircraft is in an extreme temperature high altitude cruise condition.

12. The ECS according to claim 9, wherein the ECS pack is configured to operate in a recirculation chill mode when air provided to the ECS pack from one of the gas turbine engine or the auxiliary power unit is 1-3 psi above a cabin pressure of the aircraft.

13. The ECS according to claim 9, wherein the ECS pack is configured to operate in a recirculation chill mode when air provided to the ECS pack from one of the gas turbine engine or the auxiliary power unit is between a cabin pressure and 2.5 psi below the cabin pressure of the aircraft.

14. The ECS according to claim 8, wherein discharged cabin air is supplied to at least one of the plurality of turbines to operate the compressor of the air cycle machine.

* * * * *